S. NORRIS.
Locomotive.
No. 534. Reissued Mar. 2, 1858.
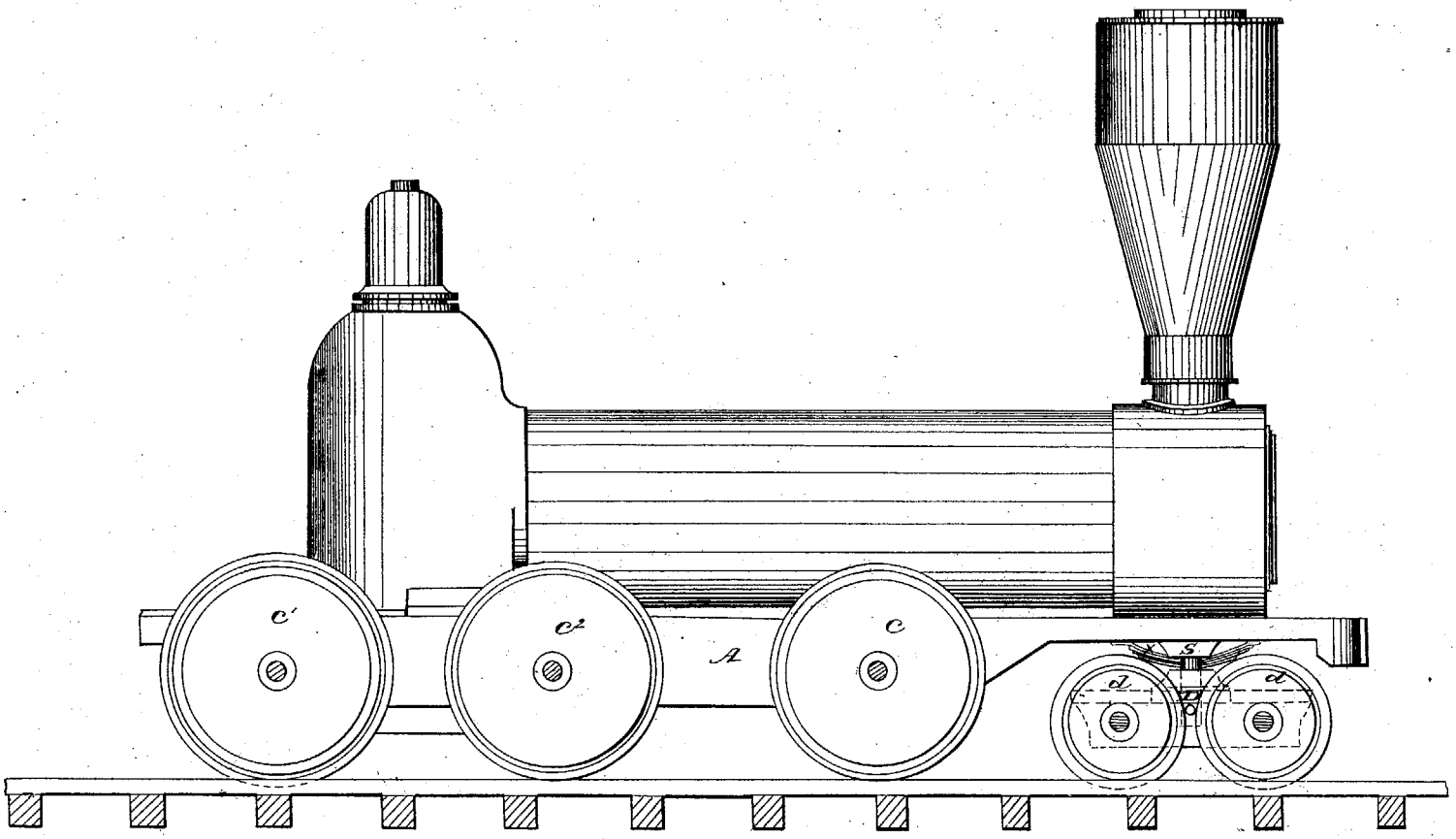
N. PETERS, PHOTO-LITHOGRAPHER, WASHINGTON, D. C.

UNITED STATES PATENT OFFICE.

SEPTIMUS NORRIS, OF PHILADELPHIA, PENNSYLVANIA.

IMPROVEMENT IN RUNNING-GEAR OF LOCOMOTIVE-ENGINES.

Specification forming part of Letters Patent No. 11,733, dated September 26, 1854; Reissue No. 534, dated March 2, 1858.

*To all whom it may concern:*

Be it known that I, SEPTIMUS NORRIS, of the city and county of Philadelphia, and State of Pennsylvania, have invented certain new and useful Improvements in Locomotive-Engines for Railroads, of which the following is a full, clear, and exact description, reference being had to the accompanying drawing, which forms part of this specification, and which represents a side elevation of my improved locomotive engine.

My invention and improvement relate to the arrangement of the driving and guide wheels of locomotives. I shall therefore omit all descriptions of the fire-box, boiler, cylinders, and their appurtenances. A suitable framing, A, serves to carry the boiler and engines and mechanism for giving motion to the driving-wheels $c$, $c'$, and $c^2$, which are arranged in pairs in the usual manner. The front pair of wheels, $c$, as represented, are situated in front of the center of the boiler, so as to be in advance of the center of gravity of the entire engine, while the axle which unites the rear pair of wheels, $c'$, crosses the frame at the back of the ash-box, and the intermediate wheels, $c^2$, run a little in advance of the rear wheels. These wheels $c$, $c'$, and $c^2$, being severally driving-wheels, may be coupled in the ordinary way by connecting rods. The rear pair of wheels, $c'$, only are flanged. A swivel-frame, D, having flanged guide-wheels $d$ on either side, is attached by a central pivot, $s$, to the front end of the engine-frame. The object of these guide-wheels is not to support the front end of the engine while running on a straight and level track, and therefore the frame does not rest upon it, the shoulders of the coupling-plates not meeting, so that the weight of the boiler and machinery is thrown upon the driving-wheels, and the flanged guide-wheels simply serve to guide the front end of the engine on the track, while the rear driving wheels, which are flanged, prevent that end of the engine from running off the track. A spring, $x$, as represented by the red lines, may be placed between the guide-wheel frame and the under side of the engine-frame to prevent a concussion when the two frames suddenly approach toward each other. The engine in turning a curve swings on its rear wheels, while the intermediate unflanged driving-wheels move laterally on the rails to either side, according to the direction of the curve. The guide-wheels thus arranged will more readily lead in the proper direction in turning a curve than they would if the weight of the locomotive rested upon them. Therefore the tendency of the engine to run off the track in turning a curve of short radius is by this arrangement diminished, while as the weight of the boiler-frame and machinery rests upon the driving-wheels their adhesion to the rails is increased to the maximum; consequently the difficulty of ascending inclined planes or moving over slippery rails is diminished in the same ratio that the tractive power of the engine is by this means augmented.

A greater or less number of driving or guide wheels may be employed, and their relative arrangement may be varied to suit the views of different constructors and to adapt them to different circumstances.

What I claim, and desire to secure by Letters Patent, is—

So arranging the running-gear of a locomotive, engine as to make the drivers support its entire weight, in combination with a pilot-truck, vibrating freely to guide the engine, substantially as described.

SEPTIMUS NORRIS.

Witnesses:

WILLIAM GEO. NORRIS,
THOS. S. CUNNINGHAM.